United States Patent
Beyda (10) Patent No.: US 6,914,519 B2
(45) Date of Patent: Jul. 5, 2005

(54) SYSTEM AND METHOD FOR MUTING ALARMS DURING A CONFERENCE

(75) Inventor: William J. Beyda, Cupertino, CA (US)

(73) Assignee: Siemens Communications, Inc., Boca Raton, FL (US)

(*) Notice: Subject to any disclaimer, the term of this patent is extended or adjusted under 35 U.S.C. 154(b) by 49 days.

(21) Appl. No.: 10/456,652

(22) Filed: Jun. 5, 2003

(65) Prior Publication Data

US 2004/0246121 A1 Dec. 9, 2004

(51) Int. Cl.[7] .................................................. G08B 9/00
(52) U.S. Cl. ................. 340/286.02; 340/468; 340/508; 340/691.3; 340/3.1; 340/7.51
(58) Field of Search ................. 340/488, 508, 340/691.1, 691.3, 691.6, 3.1, 825.36, 7.51, 7.58, 7.6, 286.02

(56) References Cited

U.S. PATENT DOCUMENTS

| | | | |
|---|---|---|---|
| 5,164,729 A | 11/1992 | Decker et al. | |
| 5,233,646 A | 8/1993 | Kuromi | |
| 5,642,156 A | 6/1997 | Saiki | |
| 5,724,416 A | 3/1998 | Foladare et al. | |
| 5,870,453 A | 2/1999 | Shapiro | |
| 5,987,106 A | 11/1999 | Kitamura | |
| 5,995,827 A | 11/1999 | Gitlin et al. | |
| 6,002,763 A | * 12/1999 | Lester et al. | 379/421 |
| 6,128,382 A | * 10/2000 | Borland et al. | 379/373.01 |
| 6,226,513 B1 | 5/2001 | Wierzbicki et al. | |
| 6,377,795 B1 | * 4/2002 | Bach et al. | 455/417 |
| 6,650,231 B1 | * 11/2003 | Byrne | 340/407.1 |
| 6,696,941 B2 | * 2/2004 | Baker | 340/539.1 |
| 6,757,534 B2 | * 6/2004 | Bach et al. | 455/417 |

* cited by examiner

Primary Examiner—Daryl C Pope (57) ABSTRACT

A system, method, apparatus, means, and computer program code for muting or disabling audible alarms or alerts during a conference or collaboration event are provided. During the conference or collaboration event, users may participate in the conference via user or client devices (e.g., computers) that are connected to or in communication with a server or collaboration system. A server, collaboration system or other device or application detects the setting of a mute alarm preference regarding one or more users. This may occur prior to a conference or during the conference. The server, collaboration system or other device then may cause the appropriate muting to occur at the appropriate or desired client devices and/or disable or mute audible alarms at one or more of the client devices (120a, 120n, 122a, 122n).

21 Claims, 8 Drawing Sheets

SYSTEM AND METHOD FOR MUTING ALARMS DURING A CONFERENCE

FIELD OF THE INVENTION

The present invention relates to telecommunications systems and, in particular, to an improved system and method for muting alarms during a conference.

BACKGROUND

The development of various voice over IP protocols such as the H.323 Recommendation and the Session Initiation Protocol (SIP) has led to increased interest in multimedia conferencing. In such conferencing, typically, a more or less central server or other device manages the conference and maintains the various communications paths to computers or other client devices being used by parties to participate in the conference. Parties to the conference may be able to communicate via voice and/or video through the server and their client devices.

Instant messaging can provide an added dimension to multimedia conferences. In addition to allowing text chatting, instant messaging systems such as the Microsoft Windows Messenger™ system can allow for transfer of files, document sharing and collaboration, collaborative whiteboarding, and even voice and video. A complete multimedia conference can involve multiple voice and video streams, the transfer of many files, and marking-up of documents and whiteboarding.

During a conference, a participant in the conference may use a computer or other client type device (e.g., personal digital assistant). The participant may receive or be confronted with multiple alarms or other notifications while participating in the conference. For example, the participant may receive a calendar alert, task reminder, urgent email alert, instant message alert, etc., each of which may set off an audible alarm on the participant's computer. Since such audible alarms may be detected or picked up by the computer's microphone, telephone microphones, Web cam microphones, etc., the alarms may be heard by other people participating in the conference or transmitted to the client devices used by the other people.

As such, there is a need for a system and method for one or more kinds of audible alarms or other alerts to be muted or otherwise disabled during a conference.

SUMMARY

Embodiments provide a system, method, apparatus, means, and computer program code for muting or disabling audible alarms or other alerts during a conference or collaboration event. During the conference or collaboration event, users may participate in the conference via client devices (e.g., computers, personal digital assistants) that are connected to or in communication with a server or collaboration system. The server or collaboration system facilitates communication and sharing of documents between the users via their respective client devices. According to some embodiments, the server, collaboration system or other device or application detects the setting of a mute alarm preference regarding one or more users (e.g., invitees to a conference, participants in a conference). This may occur prior to a conference or during the conference. The server, collaboration system or other device then may cause the appropriate muting to occur at the appropriate or desired client devices.

Additional objects, advantages, and novel features of the invention shall be set forth in part in the description that follows, and in part will become apparent to those skilled in the art upon examination of the following or may be learned by the practice of the invention.

According to some embodiments, a method for facilitating a conference may include initiating a conference, the conference having at least one associated user; detecting setting of a mute alarm preference for the at least one associated user; and disabling an audible alarm setting for a device associated with the at least one user based on the mute alarm preference. In some other embodiments, a method for facilitating a conference may include detecting setting of a mute alarm preference for at least one user associated with a conference; disabling an audible alarm setting for a device associated with the at least one user based on the mute alarm preference; and adding or enabling a visual alarm setting for the device. Other embodiments may include means, systems, computer code, etc. for implementing some or all of the elements of the methods described herein.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments, and together with the descriptions serve to explain the principles of the invention.

DETAILED DESCRIPTION

Applicant has recognized that there is a market opportunity for systems, means, computer code, and methods that allow audible alarms or alerts to be muted during a conference. During a conference, different participants may be in communication with a server or conference system via client devices. A person coordinating, participating in, and/or moderating a conference may want to mute alarms occurring on or created by the different client devices used by participants in the conference. Such audible alarms may be detected by microphones located on or near the client devices and the client devices may provide or transmit detected sounds to other participants in the conference or to their respective client devices.

Figure 1:
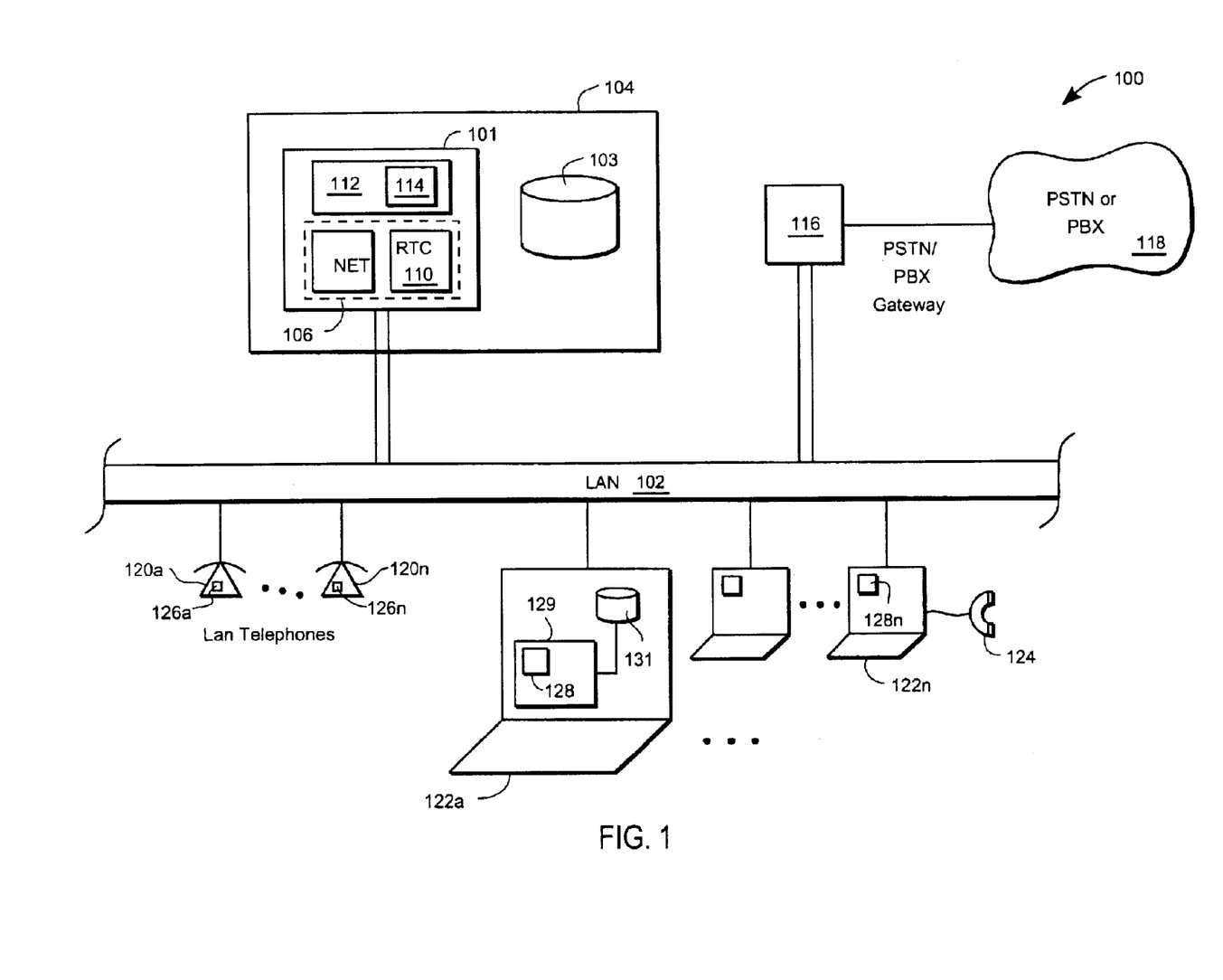
FIG. 1 is a diagram of a conference system according to some embodiments.

Referring now to FIG. 1, a diagram of an exemplary telecommunications system 100 according to some embodiments. As shown, the system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. The controller 101 may implement an instant messaging system 106. The instant messaging system may be embodied as Microsoft Windows Messenger™ software or other instant messaging system. Thus, according to certain embodiments, the instant messaging system 106 implements the Microsoft.Net™ environment 108 and Real Time Communications protocol (RTC) 110.

In addition, according to some embodiments, a collaboration system 114 may be provided, which may be part of an interactive suite of applications 112, run by controller 101, as will be described in greater detail below. In addition, an action prompt module 115 may be provided, which detects occurrences of action cues and causes action prompt windows to be launched at the clients 122.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a–120n and one or more computers 122a–122n may be operably coupled to the LAN 102. In some embodiments, one or more other types of networks may be used for communication between the server 104, computers 122a–122n, telephones 120a–120n, the gateway 116, etc. For example, in some embodiments, a communications network might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. Also, in some embodiments, one or more client devices (e.g., the computers 122a–122n) may be connected directly to the server 104.

The computers 122a–122n may be personal computers implementing the Windows XP™ operating system and thus, Windows Messenger™ instant messenger system. In addition, the computers 122a–122n may include telephony and other multimedia messaging capability using, for example, peripheral cameras, Webcams, microphones and speakers (not shown) or peripheral telephony handsets 124, such as the Optipoint™ handset, available from Siemens Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium™ type microprocessors, and storage 131 for applications and other programs.

Finally, the computers 122a–122n may implement Interaction Services 128a–128n according to embodiments. As will be described in greater detail below, the Interaction Services 128a–128n allow for interworking of phone, buddy list, instant messaging, presence, collaboration, calendar and other applications. In addition, according to some embodiments, the Interaction Services 128 allow access to the collaboration system or module 114 and the action prompt module 115 of the server 104 and thus permit the user to access and manipulate conference summaries.

Figure 2:
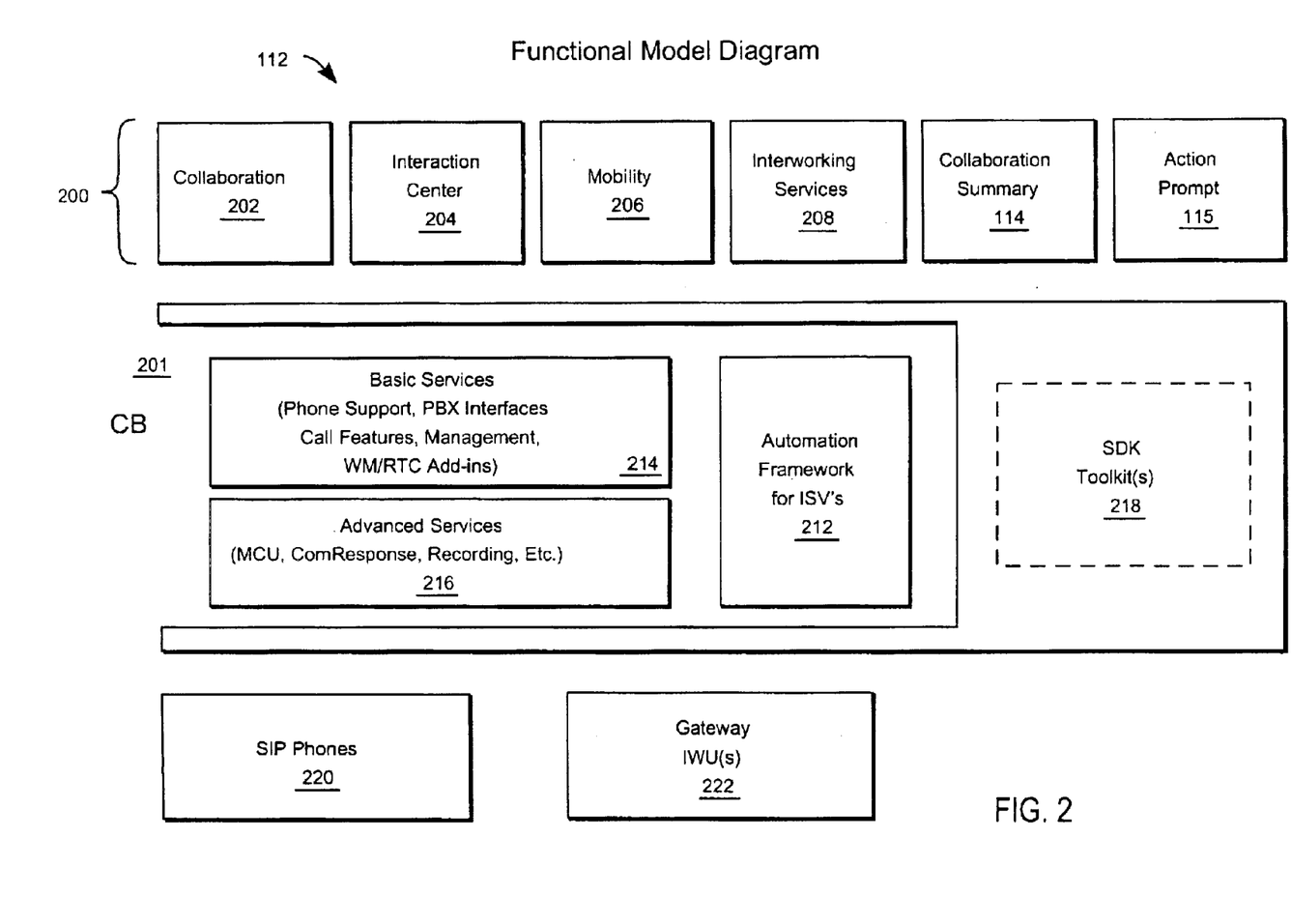
FIG. 2 is a diagram illustrating a conference collaboration system according to some embodiments.

Turning now to FIG. 2, a functional model diagram illustrating the collaboration system 114 is shown. More particularly, FIG. 2 is a logical diagram illustrating a particular embodiment of a collaboration server 104. The server 104 includes a plurality of application modules 200 and a communication broker module 201. One or more of the application modules and communication broker (CB) module 201 may include an inference engine, i.e., a rules or heuristics based artificial intelligence engine for implementing functions according to some embodiments. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218. The automation module 212 implements an automation framework for ISVs (independent software vendors) 212 that allow products, software, etc. provided by such ISVs to be used with or created the server 104.

The basic services module 214 functions to implement, for example, phone support, PBX interfaces, call features and management, as well as Windows Messaging™ software and RTC add-ins, when necessary. The phone support features allow maintenance of and access to buddy lists and provide presence status.

The advanced services module 216 implements function such as presence, multipoint control unit or multi-channel conferencing unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol. In some embodiments, an MCU may provide the ability to set up ad hoc voice, data, or multimedia conferencing sessions. During such conferencing sessions, different client devices (e.g., the computers 122a–122n) may establish channels to the MCU and server 104, the channels carrying voice, audio, video and/or other data from and to participants via their associated client devices. In some cases, more than one participant may be participating in the conference via the same client device. For example, multiple participants may be using a telephone (e.g., the telephone 126a) located in a conference room to participate in the conference. The Real-Time Transport Protocol (RTP) and the Real Time Control Protocol (RTCP) may be used to facilitate or manage communications or data exchanges between the client devices for the participants in the conference.

Presence features provide device context for both SIP registered devices and user-defined non-SIP devices. Various user contexts, such as In Meeting, On Vacation, In the Office, etc., can be provided for. In addition, voice, e-mail, and instant messaging availability may be provided across the user's devices. The presence feature enables real time call control using presence information, e.g., to choose a destination based on the presence of a user's device(s). In addition, various components have a central repository for presence information and for changing and querying presence information. In addition, the presence module provides a user interface for presenting the user with presence information.

In addition, the broker module 201 may include the ComResponse™ platform, available from Siemens Information and Communication Networks, Inc. The ComResponse™ platform features include speech recognition, speech-to-text, and text-to-speech, and allows for creation of scripts for applications. The speech recognition and speech-to-text features may be used by the collaboration summarization unit 114 and the action prompt module 115.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

The toolkit module 218 may provide tools, APIs, scripting language, interfaces, software modules, libraries, software drivers, objects, etc. that may be used by software developers or programmers to build or integrate additional or complementary applications.

According to the embodiment illustrated, the application modules include a collaboration module 202, an interaction center module 204, a mobility module 206, an interworking services module 208, a collaboration summarization module 114, and an action prompt module 115.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx™ package. It is noted that the multi-media conferencing can be handled by other products, applications, devices, etc.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, the collaboration summarization module 114 is used to identify or highlight portions of a multimedia conference and configure the portions sequentially for later playback. The portions may be stored or identified based on recording cues either preset or settable by one or more of the participants in the conference, such as a moderator. The recording cues may be based on vocalized keywords identified by the voice recognition unit of the ComResponse™ module, or may be invoked by special controls or video or whiteboarding or other identifiers.

The action prompt module 115 similarly allows a user to set action cues, which cause the launch of an action prompt window at the client. In response, the clients 122 can then perform various functions.

Figure 3:
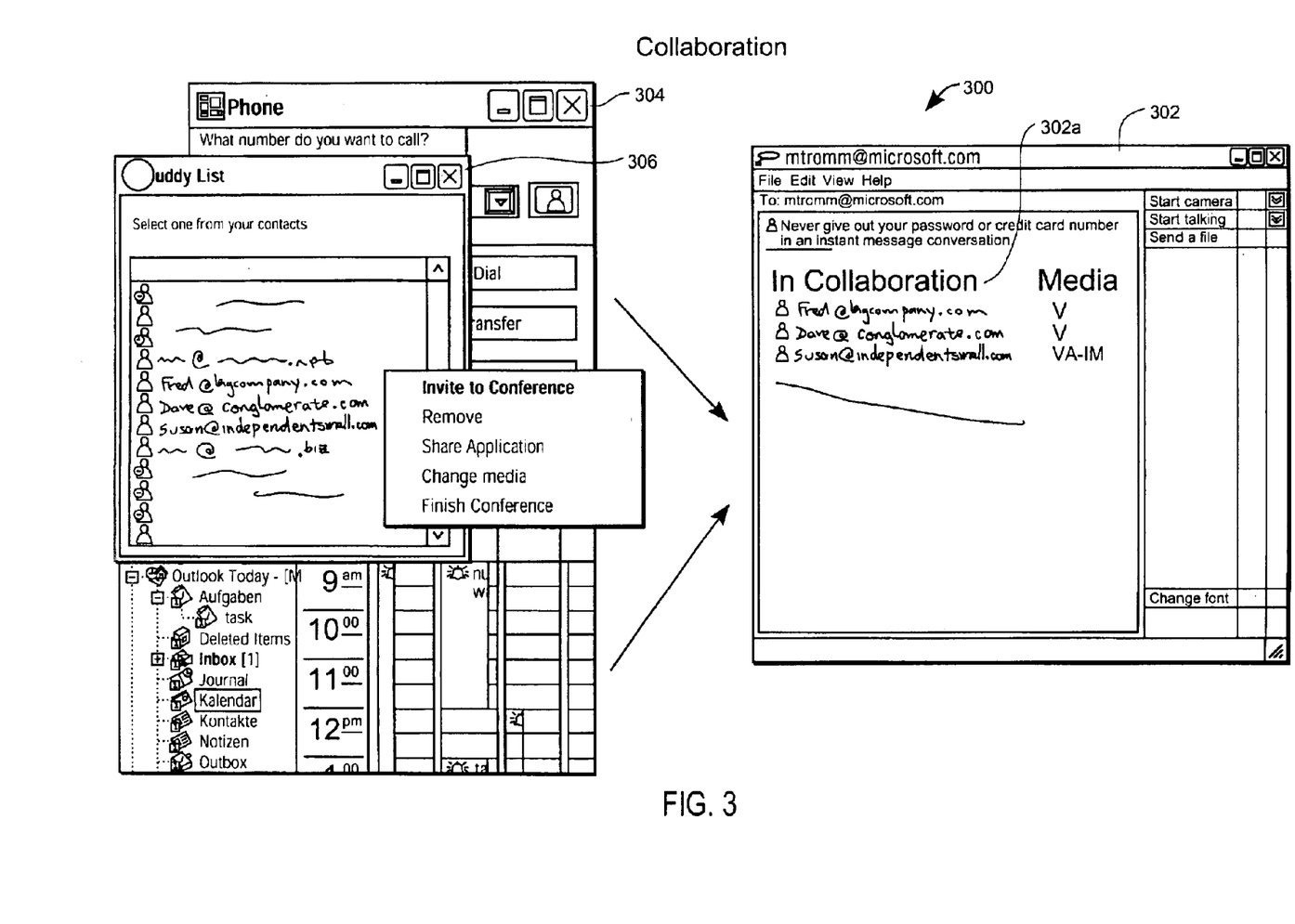
FIG. 3 is a diagram illustrating a graphical user interface according to some embodiments.

Turning now to FIG. 3, a diagram of a graphical user interface 300 according to some embodiments is illustrated. In particular, shown are a variety of windows for invoking various functions. Such a graphical user interface 300 may be implemented on one or more of the network clients (e.g., the computer 122a). Thus, the graphical user interface 300 interacts with the Interactive Services unit 128 to control collaboration sessions.

Shown are a collaboration interface 302, a phone interface 304, and a buddy list 306. It is noted that other functional interfaces may be provided. According to particular embodiments, certain of the interfaces may be based on, be similar to, or interwork with, those provided by Microsoft Windows Messenger™ or Outlook™ software.

The buddy list 306 is used to set up instant messaging calls and/or multimedia conferences. The phone interface 304 is used to make calls, e.g., by typing in a phone number, and also allows invocation of supplementary service functions such as transfer, forward, etc. The collaboration interface 302 allows for viewing the parties to a conference or collaboration 302a and the type of media involved. It is noted that, while illustrated in the context of personal computers 122, similar interfaces may be provided the telephones or cellular telephones or PDAs. During a conference or collaboration, participants in the conference or collaboration may access or view shared documents or presentations, communicate with each other via audio, voice, data and/or video channels, etc.

Figure 4:
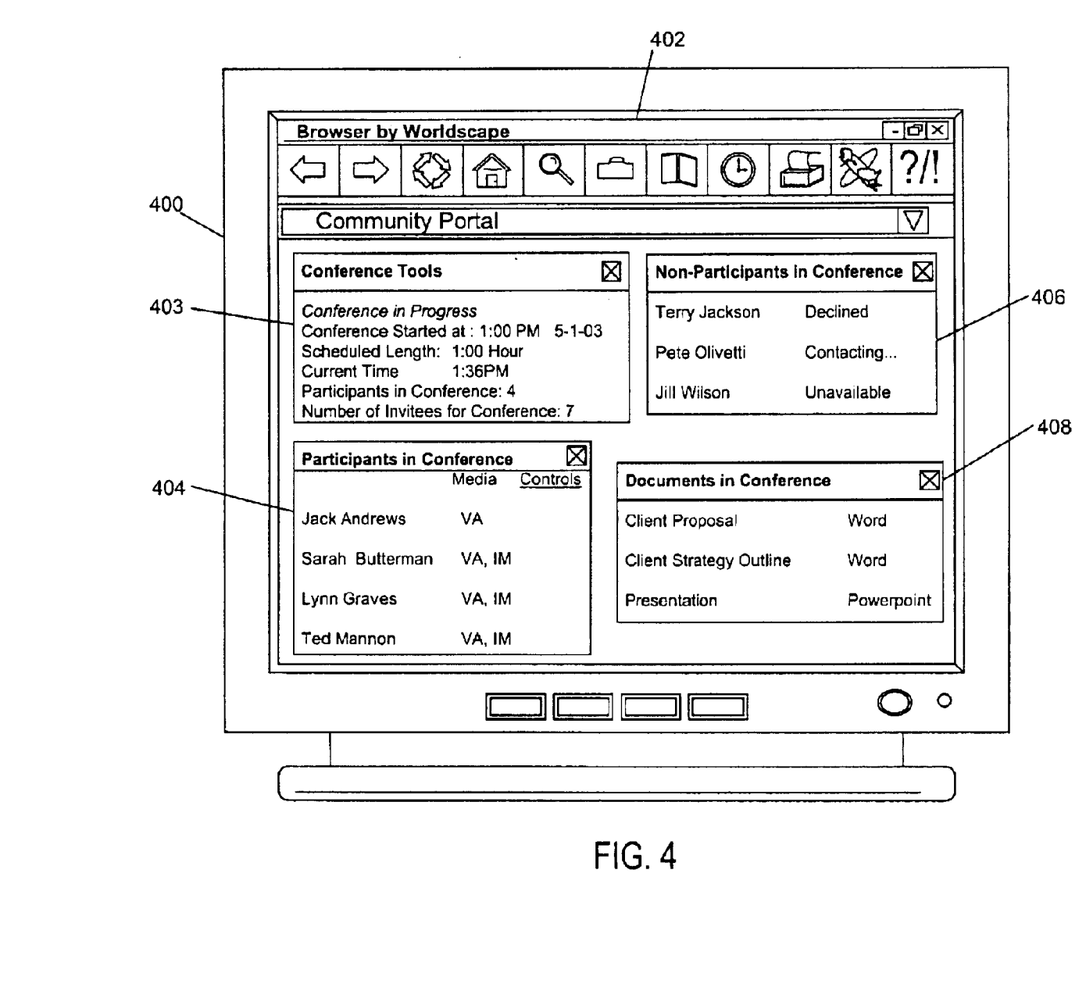
FIG. 4 is a diagram illustrating another graphical user interface according to some embodiments.

Now referring to FIG. 4, a monitor 400 is illustrated that may be used as part of a client device (e.g., computer, workstation) by a user participating, initiating, or scheduling a conference. The monitor 400 may include a screen 402 on which representative windows or interfaces 403, 404, 406, 408 may be displayed. The monitor 400 may be part of the server 104. While the windows or interfaces 302, 304, 306 illustrated in FIG. 3 provided individual users or client devices (e.g., the computer 122a) the ability to participate in conferences, send instant messages or other communications, etc., the windows or interfaces 403, 404, 406, 408 may allow an person using or located at the server 104 and/or one or more of the client computers 122a–122n the ability to establish or change settings for a conference, monitor the status of the conference, and/or perform other functions. In some embodiments, some or all of the windows 403 404, 406, 408 may not be used or displayed and/or some or all of the windows 403, 404, 406, 408 might be displayed in conjunction with one or more of the windows 302, 304, 306.

In some embodiments, one or more of the windows 403, 404, 406, 408 may displayed as part of a "community portal" that may include one or more Web pages, Web sites, or other electronic resources that are accessible by users participating in a conference, a person or device monitoring, controlling or initiating the conference, etc. Thus, the "community portal" may include information, documents, files, etc. that are accessible to multiple parties. In some embodiments, some or all of the contents of the community portal may be established or otherwise provided by one or more people participating in a conference, a person scheduling or coordinating the conference on behalf of one or more other users, etc.

As indicated in FIG. 4, the window 403 includes information regarding a conference in progress, the scheduled date of the conference (i.e., 1:00 PM on May 1, 2003), the number of participants in the conference, the number of invitees to the conference, etc.

The window 404 includes information regarding the four current participants in the conference, the communication channels or media established with the four participants, etc. For example, the participant named "Jack Andrews" is participating in the conference via video and audio (e.g., a Web cam attached to the participant's computer). The participants named "Sarah Butterman." "Lynn Graves," and "Ted Mannon" are participating in the conference via video and audio channels and have IM capabilities activated as well. The participants named "Sarah Butterman." "Lynn Graves," and "Ted Mannon" may use the IM capabilities to communicate with each other or other parties during the conference.

The window 406 includes information regarding three people invited to the conference, but who are not yet participating in the conference. As illustrated in the window 406, the invitee named "Terry Jackson" has declined to participate, the invitee named "Jill Wilson" is unavailable, and the server 104 or the collaboration system 114 currently is trying to establish a connection or communication channel with the invitee named "Pete Olivetti."

The window 408 includes information regarding documents that may be used by or shared between participants in the conference while the conference is on-going. In some embodiments, access to and/or use of the documents also may be possible prior to and/or after the conference.

As previously discussed above, in some scenarios, a person coordinating, participating in, and/or moderating a conference may want to mute alarms occurring on the different client devices used by participants in the conference. Such alarms may be detected by microphones located on or near the client devices and the sounds of the conference system may provide or transmit the sounds to other people participating in the conference.

In some embodiments, as soon as a conference or collaboration session is initiated, some or all of the audible alerts or alarms for client devices used by some or all of the participants in the conference or collaboration session may be muted automatically by the server 104 or conference system 114. At the end of the conference, the server 104 or conference system 114 may restore the original settings.

Figure 5:
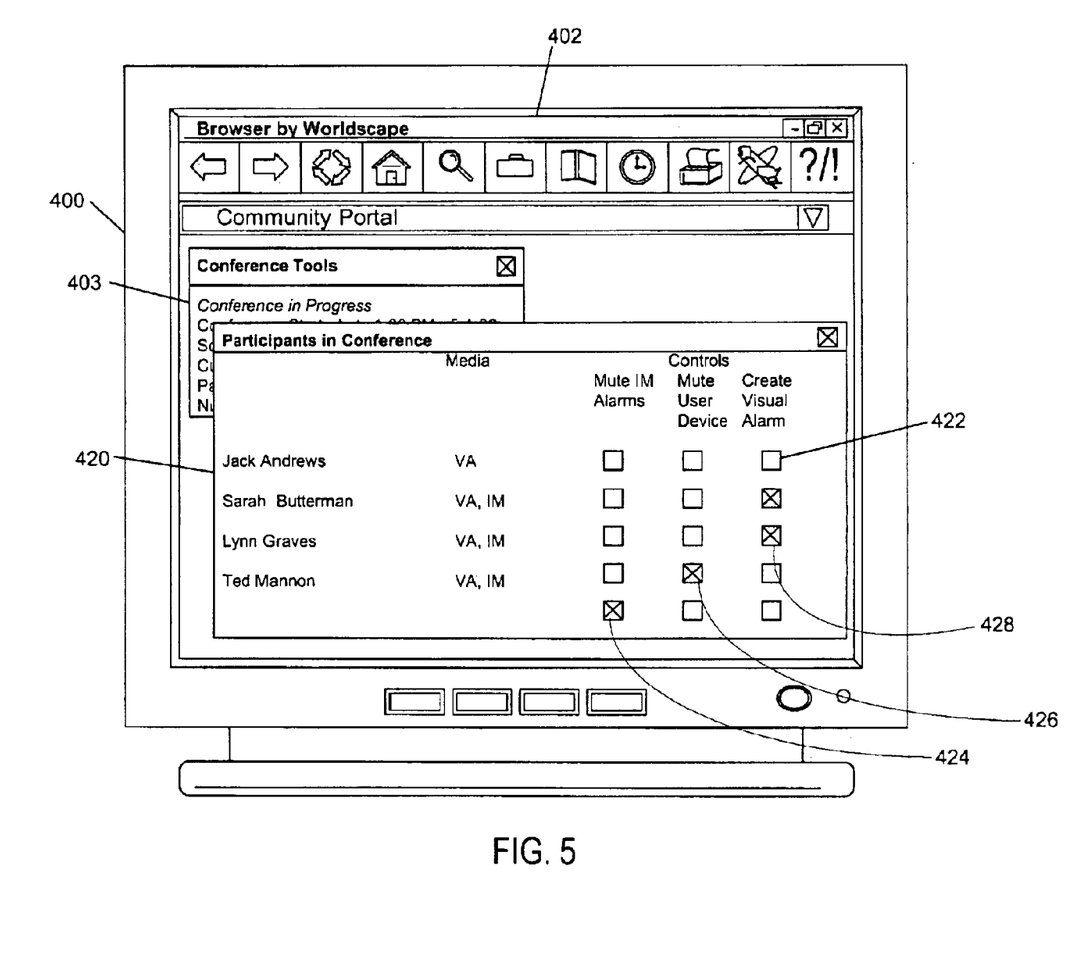
FIG. 5 is a diagram illustrating another graphical user interface according to some embodiments.

If a moderator or other user associated with a conference wishes to mute one or more alarms for one or more client devices used by participants in the conference, the moderator or user may click on or select the "Controls" link in the window 404. Clicking on or selecting the "Controls" link in the window 404 may cause the server 104 or the collaboration system 104 to display the window 420 on the screen 402, as illustrated in FIG. 5. Some or all of the windows 403, 404, 406, 408 may remain displayed on the screen 402 or may be removed from the screen 402. As alternative to the window 420, however, a "mute IM alarms", "mute calendar alarms", "mute email alarms", "mute all alarms", etc. button, icon, or other indicator may be provided on the window 404 or appear in another window, toobar, menu, pop-up display, etc. displayed on the screen 402.

In some embodiments, different participants or users may have different permissions or abilities to mute or disable the alarms of other participants and users. Thus, permission settings for one or more usings may be established. For example, a moderator or host of a conference may be able to mute or disable the audible alarms of all participants in a conference while a participant in the conference may only be able to mute or disable the audible alarms for devices associated with the participant or used by the participant to participate in the conference.

As illustrated in the window 420, different check boxes 422 may allow for muting of the IM alarms created by the participants' computers. For example, if the user clicks on or checks the check box 424, the server 104 or the collaboration system 114 may mute the IM alarms for all of the four participants. The participants still will receive their instant messages, only now their respective computers or clients devices will not provide audible alarms to indicate the arrival of a new instant message. In some embodiments, the server 104 or the collaboration system 114 may send a signal to the participants' computers to indicate to the computers that such audible alarms should not be used or provided. As another example, if the user clicks on or checks the check box 426, the server 104 or the collaboration system 114 may mute the entire client device for the participant named "Ted Mannon." Thus, for example, the speakers for the client device may be turned off or muted. As a third example, if the user clicks on or checks the check box 428, the server 104 or the collaboration system 114 may create a visual alarm or alert for the conference participant named "Lynn Graves" when he or she receives an instant message. Different applications, participants, audible alerts, etc. may receive different types of visual alarms or alarms and different permissions may be applied to different people with regard to their respective abilities to mute or disable audible alarms and/or enable or establish visual alarms. In other embodiments, dialog boxes may be used instead of or in conjunction with visual alarms or cues. Different applications, participants, audible alerts, etc. may receive different types of dialog boxes. In some embodiments, the server 104 or the collaboration system 114 may send a signal to the participant's computer to indicate to the computer that such visual alarm should be used or provided instead of an audible alarm. As seen by these examples, the server 104 or the collaboration system 114 may be able to control or communicate with the client devices used by participants in the conference such that muting of the IM alarms and/or changing of the IM alarms from audible alarms to visual alarms can be accomplished.

In some embodiments, one or more users may be limited to which participant's alarms or types of alarms they can mute. For example, some participants may be limited to muting only their own alarms, only IM related alarms, etc. The window 420 may be presented or configured differently for different users of the window 420 to reflect the different privileges or permissions of the users. In addition, in some embodiments, windows displayed to different users by their respective client devices might include a "mute my IM alarms", "mute my calendar alarms", "mute my email alarms", "mute my all alarms", etc. button, icon, or link.

In a manner similar to that described above in relation to IM alarms, in some embodiments a user may be able to mute or change alarms relating to other types messages, reminders, etc. For example, now referring to FIG. 6, clicking on or selecting the "Controls" link in the window 404 may cause the server 104 or the collaboration system 114 to display the window 430 on the screen 402. The window 430 may include check boxes 432 that allow the user to mute email alarms, calendar alarms, task reminders, or other types of alarms, set up visual alarms instead of audio alarms, etc.

Figure 6:
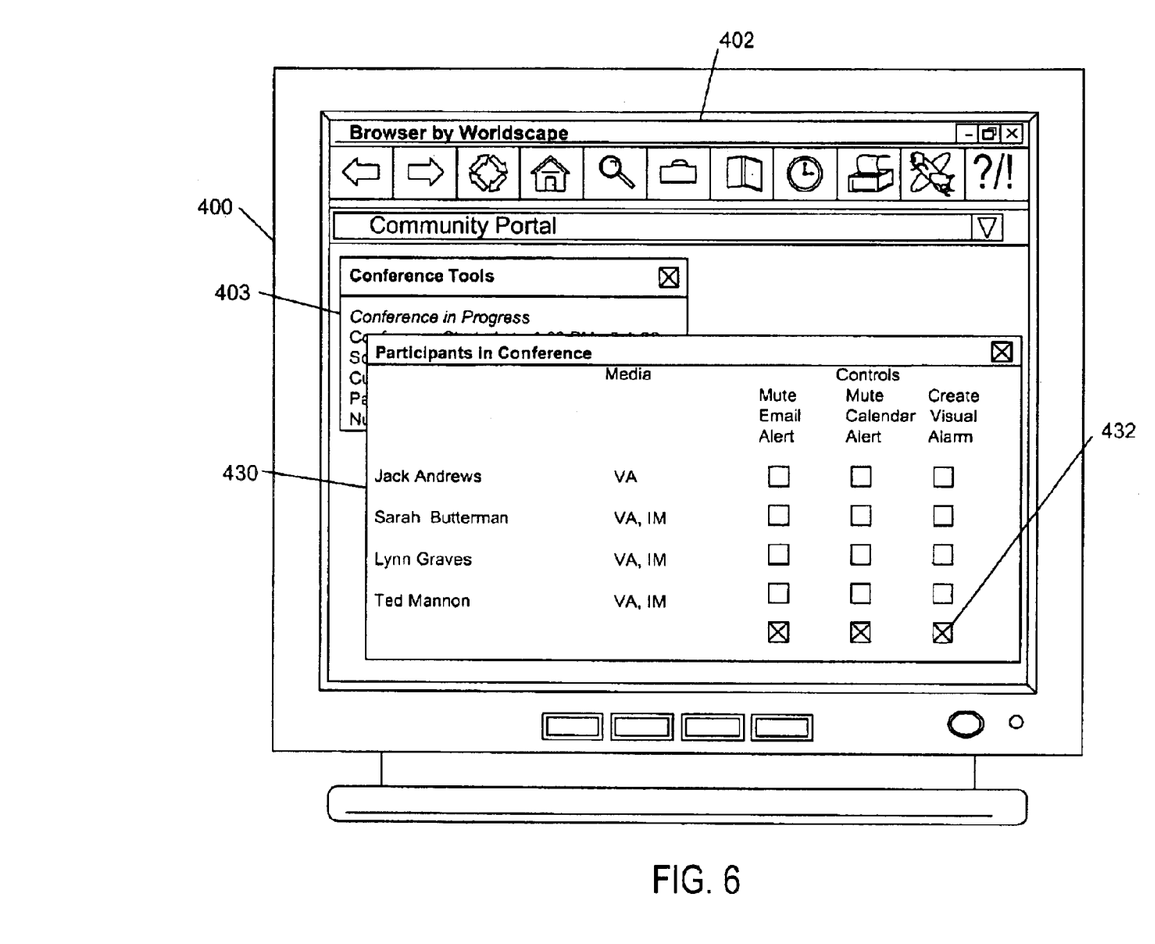
FIG. 6 is a diagram illustrating another graphical user interface according to some embodiments.

As illustrated in FIG. 4 to FIG. 6, in some embodiments the server 104 of the conference system 114 may be adapted to display a window indicating participants in the conference and adapted to receive input via the window, the input being indicative of a type of audible alarm to be muted, the input indicating that an audible alarm associated with at least participant in the conference is to be muted, and/or the input indicating that a visual alarm is to be provided to at least one participant in the conference. The server 104 or conference system 114 may be adapted to receive data indicative of a type of alarm to be muted and/or data indicative of at least one user for whom an alarm is to be muted.

Process Description

Figure 7:
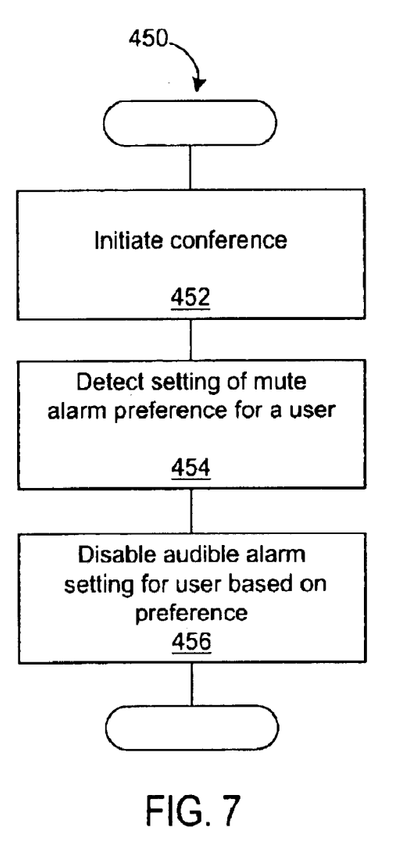
FIG. 7 is a flowchart of a method in accordance with some embodiments.

Reference is now made to FIG. 7, where a flow chart 450 is shown which represents the operation of a first embodiment of a method. The particular arrangement of elements in the flow chart 450 is not meant to imply a fixed order to the method 450; embodiments can be practiced in any order that is practicable. In some embodiments, some or all of the elements of the method 450 may be performed or completed by the server 104, the collaboration system 114, or another device or application, as will be discussed in more detail below.

Processing begins at 452 during which the server 114 or the collaboration system 114 facilitates, conducts or otherwise initiates a conference or collaborative call. In some embodiments, 452 may include or be the establishing of the conference, which may include such things as establishing or identifying the date/time of the conference, establishing or identifying the invitees and/or participants for the conference, establishing or identifying the documents to be used in the conference, etc. Thus, 452 may occur prior to the actual conference date/time. As a result, the muting of IM or other alarms for participants may occur as part of the set up of the conference or before the conference actually starts. In some other embodiments, 452 may occur during or as part of the conference and/or include beginning the actual conference on the established date and time. In some embodiments, 452 may include facilitating communication between at least two participants in a conference. In some embodiments, 452 may include or be facilitating or conducting the conference.

During 454, the server 104 or the collaboration system 114 detects a setting of a mute setting alarm preference for one or more users. In some embodiments, the user may be an invitee or expected participant in the conference if the conference has not yet started, or an actual participant in the conference if the conference has already started. In some embodiments, the server 104 or collaboration system 114 may provide or display a screen or window, such as the window 404, 420, and/or 430 to allow a user to indicate a desire to mute an audible alarm relating to an instant message, email message, calendar notification, task reminder, etc. In some embodiments, 454 may include or be the server 104 or the collaboration system 114 receiving data indicative of such a need, preference or desire to mute such an alarm. Thus, in some embodiments, a mute alarm preference may be indicative or representative of a desire to mute an audible alarm for one, some, or all participants in a conference, a desire to mute a specific type of alarm (e.g., IM alarm, email alarm, calendar alarm) for one, some or all participants in conference, a desire to mute an instant message alarm (e.g., a tone or sound indicating receipt or arrival of an instant message), an email message alarm (e.g., a sound or tone indicating receipt or arrival of an email message), a calendar alarm (e.g., a sound or tone indicating the occurrence of a specific time, date, meeting, etc. or a reminder message), a task reminder alarm (e.g., a sound or tone designed to indicate or coincide with a reminder message), etc.

During 456, the server 104 or the collaboration system 114 disables or mutes the audible alarm settings for the one or more users as directed in 454. In some embodiments, the server 104 or the collaboration system 114 may send a signal, message, or other data to a computer or other device (e.g., the computer 122a) used by a participant in the conference to cause or initiate the appropriate alarm muting at the device. Thus, in some embodiments, 456 may include or be the sending of the signal, message or other data. In some cases, the signal, message, or other data sent to the participant's device may cause muting of all sound from the device. In some embodiments, muting of one or more audible alarms for one or more participants, applications, etc. may occur automatically at the start of a conference. Thus, a setting to mute one or more alarms during a conference may occur in advance of the conference.

In some embodiments, the method 450 may include reestablishing or enable the original alarms settings after the conference is over. For example, at the end of a conference, the server 104 or the collaboration system 114 may enable or unmute the alarm settings that were muted during 456. The server 104 or the collaboration system 114 may send a signal, message, or other data to a computer or other device (e.g., the computer 122a) used by a participant in the conference to cause or initiate the resetting or enabling of the appropriate alarm muting function at the device or to enable the original settings at the device. This may occur during or after the conference. In some embodiments, the method 450 may include determining the end of the conference or ending the conference initiated during 452.

In some embodiments, the method 450 may include setting or creating a visual or other type of alarm for the one or more users. For example, in some embodiments, the server 104 or the collaboration system 114 may send a signal, message, or other data to a computer or other device (e.g., the computer 122n) used by a participant in the conference to cause or initiate a visual alarm to occur at the device instead of an audible alarm.

In some embodiments of the method 450, 452 might not be needed. For example, a method for facilitating a conference may include detecting setting of a mute alarm preference for at least one user associated with a conference; and disabling an audible alarm setting for a device associated with the at least one user based on the mute alarm preference.

Figure 8:
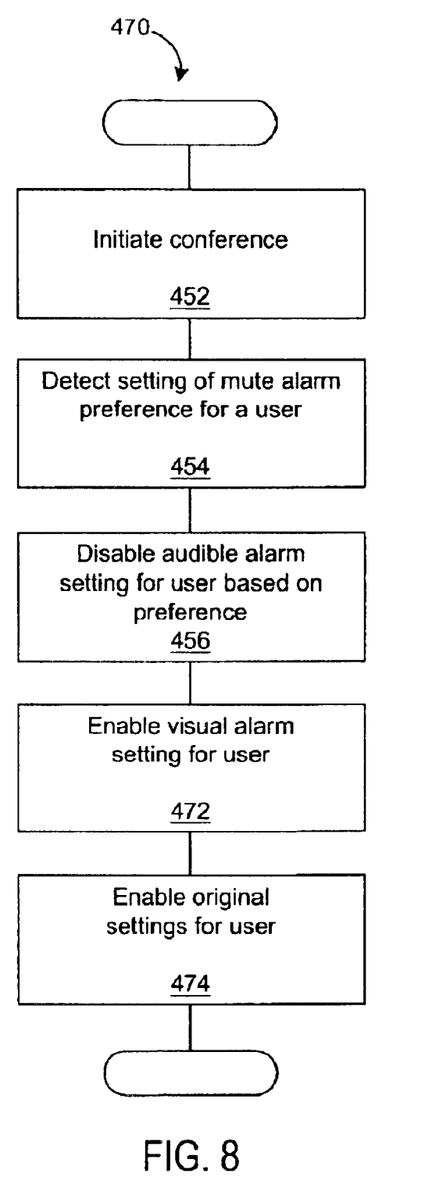
FIG. 8 is another flowchart of a method in accordance with some embodiments.

Reference is now made to FIG. 8, where a flow chart 470 is shown which represents the operation of a second embodiment of a method. The particular arrangement of elements in the flow chart 470 is not meant to imply a fixed order to the elements; embodiments can be practiced in any order that is practicable. In some embodiments, some or all of the elements of the method 470 may be performed or completed by the server 104, the collaboration system 114, or another device or application, as will be discussed in more detail below.

The method 470 includes 452, 454, and 456 previously discussed above. In addition, the method 470 includes 472 during which a visual alarm is enabled or established for the user in replacement of the audible alarm that was muted or disable during 456. In some embodiments, the server 104 or the collaboration system 114 may send a signal, message, or other data to a computer or other device (e.g., the computer 122a) used by a participant in the conference to cause or initiate the appropriate visual alarm at the device. Thus, in some embodiments, 472 may include or be the sending of the signal, message or other data.

During 474, the original settings for the user are enabled or reestablished. For example, when the conference ends the server 104 or the collaboration system 114 may reestablish the user's original alarm settings. In some embodiments, the server 104 or the collaboration system 114 may send a signal, message, or other data to a computer or other device (e.g., the computer 122a) used by a participant in the conference to reestablish or enable the original settings at the device. Thus, in some embodiments, 474 may include or be the sending of the signal, message or other data.

Server

Figure 9:
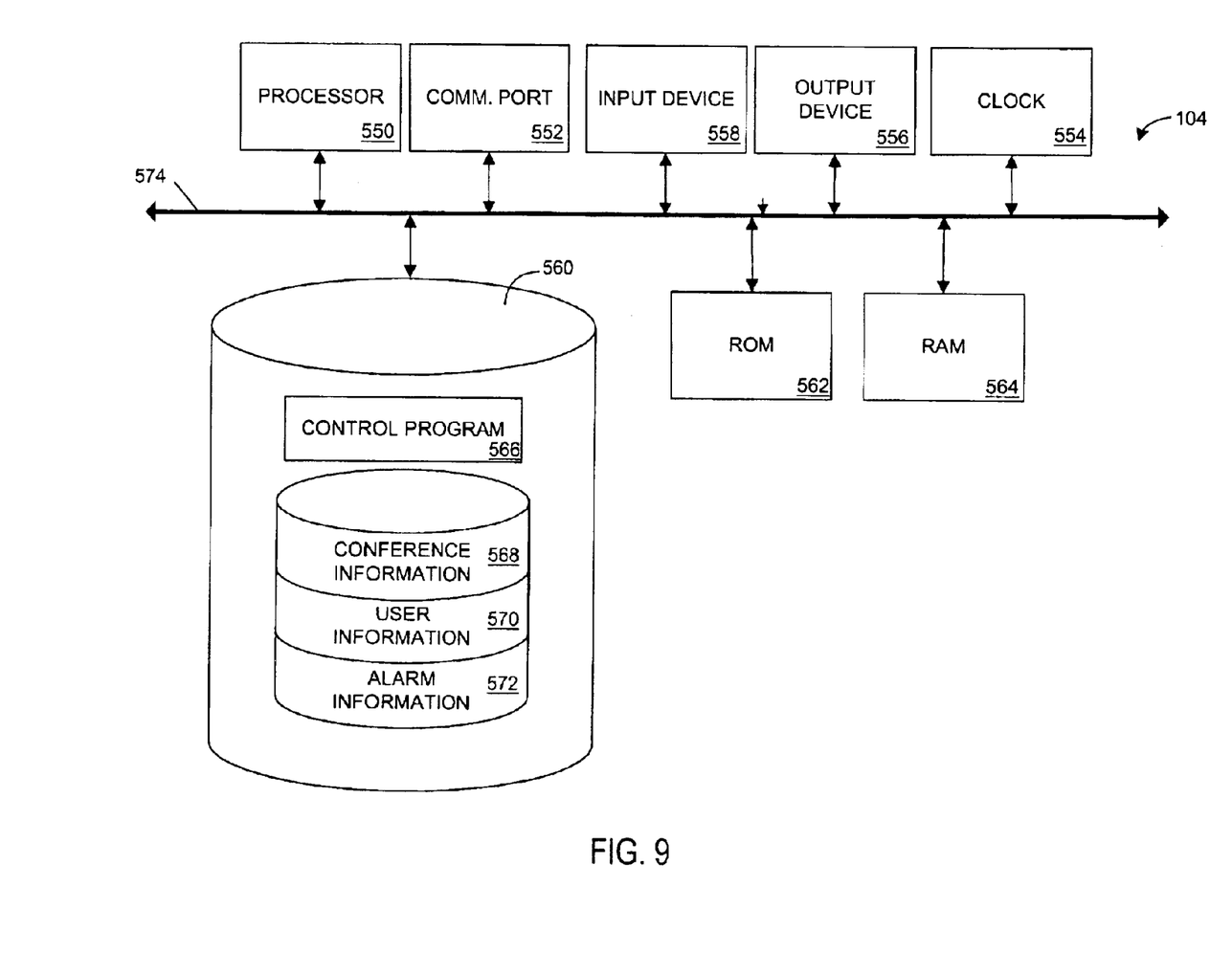
FIG. 9 is a block diagram of possible components that may be used in some embodiments of the server of FIG. 1.

Now referring to FIG. 9, a representative block diagram of a server or controller 104 is illustrated. The server 104 can comprise a single device or computer, a networked set or group of devices or computers, a workstation, mainframe or host computer, etc., and may include the components described above in regards to FIG. 1. In some embodiments, the server 104 may be adapted to implement one or more of the elements of the methods disclosed herein.

The server 104 may include a processor, microchip, central processing unit, or computer 550 that is in communication with or otherwise uses or includes one or more communication ports 552 for communicating with user devices and/or other devices. The processor 550 may be or include some or all of the controller 101 previously discussed above. In some embodiments, the processor 550 may be operative to implement one or more elements of the methods disclosed herein.

Communication ports may include such things as local area network adapters, wireless communication devices, Bluetooth technology, etc. The server 104 also may include an internal clock element 554 to maintain an accurate time and date for the server 104, create time stamps for communications received or sent by the server 104, etc.

If desired, the server 104 may include one or more output devices 556 such as a printer, infrared or other transmitter, antenna, audio speaker, display screen or monitor (e.g., the monitor 400), text to speech converter, etc., as well as one or more input devices 558 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 104 may include a memory or data storage device 560 (which may be or include the memory 103 previously discussed above) to store information, software, databases, documents, communications, device drivers, etc. The memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 104 also may include separate ROM 562 and RAM 564.

The processor 550 and the data storage device 560 in the server 104 each may be, for example: (i) located entirely within a single computer or other computing device; or (ii) connected to each other by a remote communication medium, such as a serial port cable, telephone line or radio frequency transceiver. In one embodiment, the server 104 may comprise one or more computers that are connected to a remote server computer for maintaining databases.

A conventional personal computer or workstation with sufficient memory and processing capability may be used as the server 104. In one embodiment, the server 104 operates as or includes a Web server for an Internet environment. The server 104 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 550. Equivalent processors are available from Motorola, Inc., AMD, or Sun Microsystems, Inc. The processor 550 also may comprise one or more microprocessors, computers, computer systems, etc.

Software may be resident and operating or operational on the server 104. The software may be stored on the data storage device 560 and may include a control program 566 for operating the server, databases, etc. The control program 566 may control the processor 550. The processor 550 preferably performs instructions of the control program 566, and thereby operates in accordance with the present invention, and particularly in accordance with the methods described in detail herein. The control program 566 may be stored in a compressed, uncompiled and/or encrypted format. The control program 566 furthermore includes program elements that may be necessary, such as an operating system, a database management system and device drivers for allowing the processor 550 to interface with peripheral devices, databases, etc. Appropriate program elements are known to those skilled in the art, and need not be described in detail herein.

The server 104 also may include or store information regarding users, user devices, conferences, alarm settings, documents, communications, etc. For example, information regarding one or more conferences may be stored in a conference information database 568 for use by the server 104 or another device or entity. Information regarding one or more users (e.g., invitees to a conference, participants to a conference) may be stored in a user information database 570 for use by the server 104 or another device or entity and information regarding one or more alarm settings may be stored in an alarm information database 572 for use by the server 104 or another device or entity. In some embodiments, some or all of one or more of the databases may be stored or mirrored remotely from the server 104.

According to some embodiments, the instructions of the control program may be read into a main memory from another computer-readable medium, such as from the ROM 562 to the RAM 564. Execution of sequences of the instructions in the control program causes the processor 550 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 550, communication port 552, clock 554, output device 556, input device 558, data storage device 560, ROM 562, and RAM 564 may communicate or be connected directly or indirectly in a variety of ways. For example, the processor 550, communication port 552, clock 554, output device 556, input device 558, data storage device 560, ROM 562, and RAM 564 may be connected via a bus 574.

While specific implementations and hardware configurations for the server 104 have been illustrated, it should be noted that other implementations and hardware configurations are possible and that no specific implementation or hardware configuration is needed. Thus, not all of the components illustrated in FIG. 9 may be needed for the server 104 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention. The invention described in the above detailed description is not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for facilitating a conference call, comprising:
   initiating a conference call, said conference call having at least one associated user;
   detecting a setting of a mute alarm preference for said at least one associated user; and
   disabling an audible alarm setting for a device associated with said at least one user based on said mute alarm preference during the conference call.

2. The method of claim 1, wherein said initiating a conference call includes facilitating communication between at least two participants in said conference call.

3. The method of claim 1, wherein said detecting a setting of a mute alarm preference for said at least one associated user includes detecting said setting of said mute alarm preference prior to said conference call beginning.

4. The method of claim 1, wherein said detecting a setting of a mute alarm preference for said at least one associated user includes detecting said setting of said mute alarm preference after said conference call has started.

5. The method of claim 1, wherein said disabling an audible alarm setting for a device associated with said at least one user based on said mute alarm preference includes sending data to said device instructing said device to disable said audible alarm.

6. The method of claim 1, further comprising:
   enabling a visual alarm setting for said device.

7. The method of claim 1, further comprising:
   enabling original settings for said device.

8. The method of claim 1, wherein said mute alarm preference is indicative of at least one of the following:
   a desire to mute an audible alarm for all participants in said conference call;
   a desire to mute a specific type of alarm for said at least one user; and
   a desire to mute a specific type of alarm for all participants in said conference call.

9. The method of claim 1, wherein said mute alarm preference is indicative of at least one of the following:
   a desire to mute an instant message alarm associated with said at least one user;
   a desire to mute an email message alarm associated with said at least one user;
   a desire to mute a calendar alarm associated with said at least one user; and
   a desire to mute a task reminder alarm associated with said at least one user.

10. The method of claim 1, further comprising:
    establishing a permission setting associated with said audible alarm and said associated user.

11. A method for facilitating a conference call, comprising:
    detecting a setting of a mute alarm preference for at least one user associated with a conference call; and
    disabling an audible alarm setting for a device associated with said at least one user based on said mute alarm preference during the conference call.

12. A system for facilitating a conference, comprising:
    a network;
    at least one client device operably connected to said network;
    a server operably coupled to said network, said server adapted to manage a conference call and to provide data to said at least one client device instructing said client device to mute an audible alarm during the conference call.

13. The system of claim 12, wherein said server is adapted to display a window indicating participants in said conference call.

14. The system of claim 13, wherein said server is adapted to receive input via said window, said input being indicative of a type of audible alarm that is to be muted.

15. The system of claim 13, wherein said server is adapted to receive input via said window, said input indicating that an audible alarm associated with at least one participant in said conference call to be muted.

16. The system of claim 13, wherein said server is adapted to receive input via said window, said input indicating that a visual alarm is to be provided to at least one participant in said conference call.

17. The system of claim 13, wherein said server includes a conference system.

18. The system of claim 13, wherein said server is adapted to receive data indicative of a type of alarm to be muted.

19. The system of claim 13, wherein said server is adapted to receive data indicative of at least one user for whom an alarm is to be muted.

20. A system for facilitating a conference call, comprising:

a memory;

a communication port; and a processor connected to said memory and said communication port, said processor being operative to:

detect setting of a mute alarm preference for at least one user associated with a conference call; and disable an audible alarm setting for a device associated with said at least one user based on said mute alarm preference during the conference call.

21. A computer program product in a computer readable medium for facilitating a conference call, comprising:

first instructions for determining the setting of a mute alarm preference for at least one user associated with a conference call; and second instructions for muting an audible alarm for a device associated with said at least one user based on said mute alarm preference during the conference call.

* * * * *